United States Patent [19]
Arai et al.

[11] Patent Number: 5,768,484
[45] Date of Patent: Jun. 16, 1998

[54] PRINTING APPARATUS AND CONTROL METHOD THEREFOR

[75] Inventors: Koji Arai, Kawaguchi; Eiichi Motoyama, Tokyo, both of Japan

[73] Assignee: Canon Kabushiki Kaisha, Tokyo, Japan

[21] Appl. No.: 433,211

[22] Filed: May 2, 1995

[30] Foreign Application Priority Data

May 11, 1994 [JP] Japan .................... 6-097329

[51] Int. Cl.$^6$ ................ G06F 15/00; H04N 1/40
[52] U.S. Cl. .............. 395/145; 395/114; 395/163; 395/164; 358/444
[58] Field of Search ............. 358/444; 395/114, 395/115, 163, 164, 165, 166, 116, 117, 112

[56] References Cited

U.S. PATENT DOCUMENTS

| | | | |
|---|---|---|---|
| 5,084,831 | 1/1992 | Morikawa et al. | 395/116 |
| 5,117,374 | 5/1992 | Goetz | 364/559 |
| 5,467,437 | 11/1995 | Fuse | 395/115 |

Primary Examiner—Edward L. Coles, Sr.
Assistant Examiner—Mark Wallerson
Attorney, Agent, or Firm—Fitzpatrick, Cella, Harper & Scinto

[57] ABSTRACT

A printing apparatus capable of printing a mirror image without increasing the apparatus size. Print data for one band image is stored into an image memory 7 in accordance with an address (in an ascending order) generated by an address counter 103. After storing the print data for one scanning by a print head 101 has been completed in the image memory 7, the print data is read out in accordance with an address (in an descending order) generated by an address counter 104 from the image memory 7, and outputted to the print head 101. At this time, since print data which has previously been used for printing is used no longer, the address counter 103 is set to generate an address in the descending order, and storing of the next print data is made in parallel to the printing. When the printing based on the print data in one scanning has been completed, an address counter 106 is set to generate an address in the ascending order for the next image printing. In this manner, mirror-image printing is performed with changing over a counter update direction between ascending/descending orders.

19 Claims, 13 Drawing Sheets

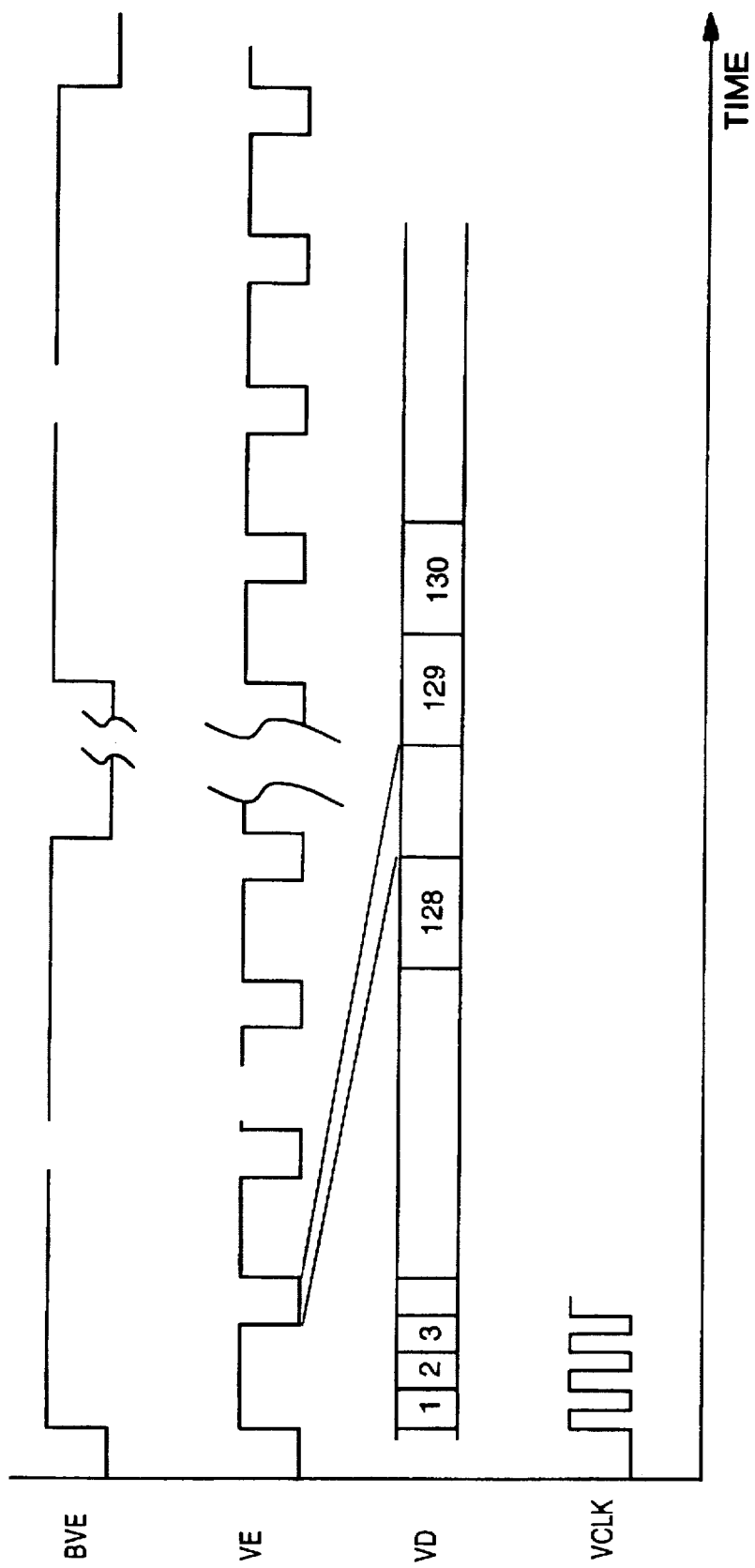

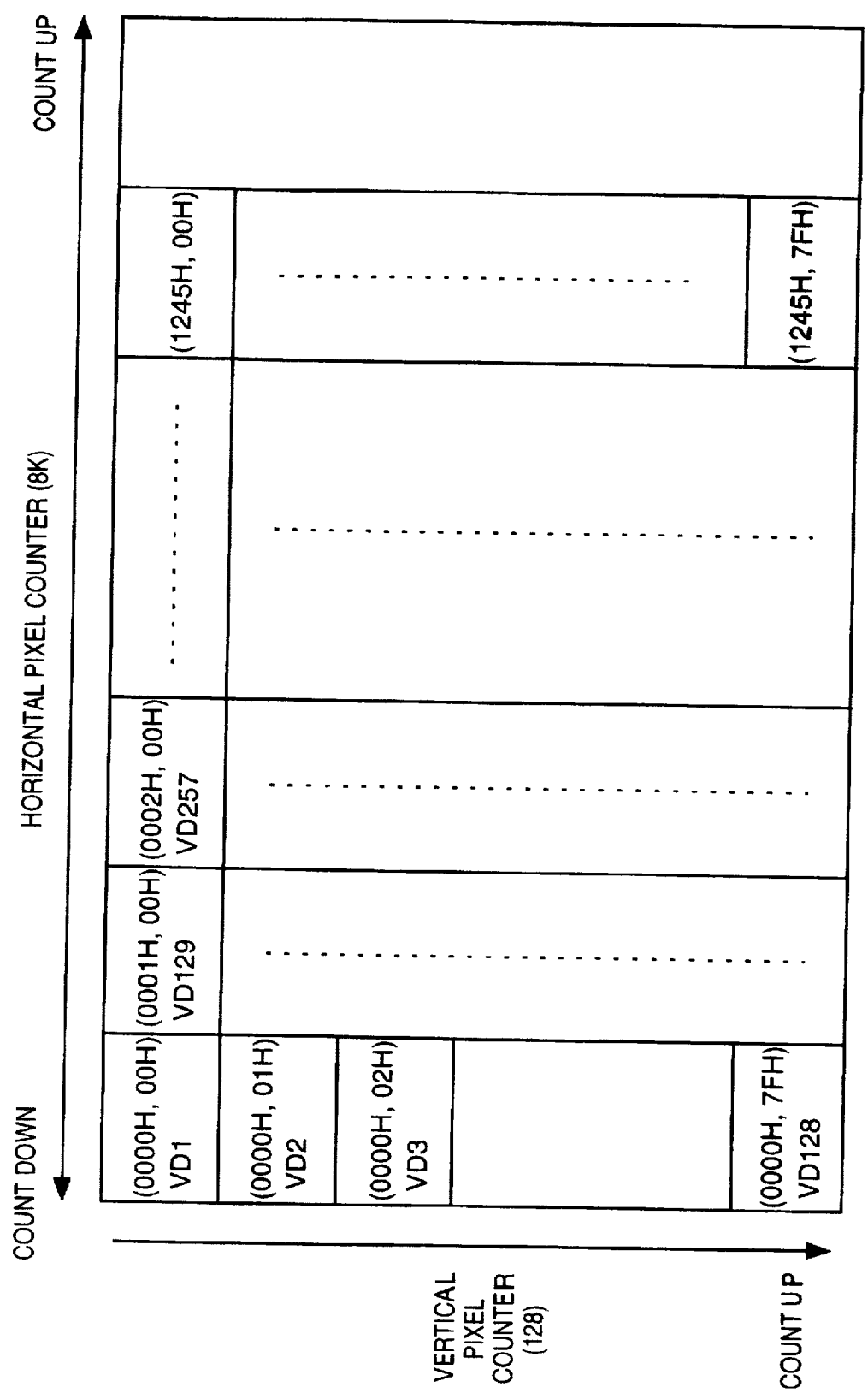

PRINTING APPARATUS AND CONTROL METHOD THEREFOR

BACKGROUND OF THE INVENTION

Present invention relates to a printing apparatus and a control method for the printing apparatus and, more particularly to a printing apparatus which scans a recording head for printing an image and a method for controlling the printing apparatus.

First, printing operation by a printing apparatus of this type will be described with reference to FIG. 3.

In FIG. 3, reference numeral 201 denotes a recording medium (recording sheet); and 202, a print head. The print head 202 has a plurality of (e.g., 128) recording elements aligned in a vertical direction. While the print head 202 moves in an arrow 203 direction (main-scanning) at a predetermined speed, the recording head is activated at predetermined intervals (recording density in a main-scanning direction). Thus, an image having a printing width corresponding to the length between the uppermost recording element and the lowest recording element (hereinafter referred to as a "band image") is printed.

As one band image is printed, the print head 202 returns to a home position (a left end position in FIG. 3), while the recording medium 201 is shifted in an arrow 204 direction (subscanning) by an amount corresponding to one band printing width. Hereinafter, the main-scanning and subscanning repeat a predetermined number of times, to complete printing for one page.

Next, reading operation by a copying machine having the above printing unit will be described with reference to FIG. 4.

In FIG. 4, numeral 302 denotes a reading head having a plurality of (e.g., 128, if in correspondence with the recording elements) optical reading devices aligned in a vertical direction (generally, a line sensor).

The operation is similar to that in FIG. 3. That is, the reading head 302 moves in a main-scanning direction to read an original image in a band unit, then, returns to a home position, and while the original image is moved relatively to the recording medium in a subscanning direction by an amount corresponding to the bandwidth. These movements repeat for one original image.

Next, copying operation as the whole operation of the apparatus will be described with reference to a timing chart in FIG. 5.

In FIG. 5, alphabets VE denotes an enable-interval signal for the recording head and the reading sensor; BVE, an enable-interval signal in the main-scanning direction; and VD, image data. There are 128 pixel data VD1 to VD128 in an interval where the enable signal VE is active. Upon image reading, 128 pixel data are sequentially outputted, from VD1 to VD128, in an arrow 305 direction in FIG. 4. Upon image formation, the recording elements are sequentially activated in an arrow 205 direction in FIG. 2, based on the pixel data, sequentially transferred in the order of VD1 to VD128, to perform printing.

In a case where the conventional copying machine having the band-scanning image reading unit as described above prints a mirror image derived from an original image, the copying machine operates, as shown in FIGS. 6A and 6B:

(1) Contrary to the operation in FIG. 4, the reading head 302 moves from a right end position, as a reading start position as shown in FIG. 6A, toward the left end position. At this time, image data is outputted in the same arrow 305 direction.

(2) Contrary to the operation in FIG. 4, the reading head 302 moves from the lowest position as a reading start position as shown in FIG. 6B, in the same arrow 303 direction while reading. However, opposite to the arrow 305 in FIG. 4, the direction in which pixel data are outputted is an arrow 502 direction.

In any of (1) and (2), the printing operation is the same as that shown in FIG. 3.

However, when the above copying machine prints a mirror image in the above-described manner, the following problems occur.

Generally, a reading head requires to have an approach run to reach the predetermined moving speed and maintain the speed. In the operation (1), as the reading start position is opposite to the reading start position in normal copying, the reading unit must have runway portions at both ends, thus the apparatus size increases.

In the operation (2), the output image is turned upside down. Further, if the original is shifted as in subscanning, the direction conveying the original is opposite to the normal conveying direction. That is, the original is set at a different position. In copying a mirror image, the original may be once conveyed to the position in FIG. 6B and then conveyed in an opposite direction in band units, however, this complicates the operation in comparison with the normal copying operation.

In any case, the copying apparatus uses the reading units to form a mirror image. Accordingly, when the copying apparatus operates as a printer, the apparatus cannot print a mirror image based on image data received from a computer.

SUMMARY OF THE INVENTION

The present invention has been made in consideration of the above situation, and has as its object to provide a printing apparatus that enables mirror-image printing without increasing the apparatus size, and a control method for the printing apparatus.

According to the present invention, the above object is attained by providing a printing apparatus which prints an image in band units, by scanning a print head having a plurality of printing devices, comprising: memory means in which image data, used for printing one band image by at least one scanning by the print head, is stored; recording means for performing printing by, when image data for one scanning has been stored into the storage means, reading the image data from the storage means, with a read address generated in a direction opposite to a direction of a write address used for storing the image data, and by supplying the image data to the print head; and storage means for, while the printing is performed by the recording means, updating the write address in a direction the same as the direction of the read address, and sequentially storing image data for printing the next band image.

According to one aspect of the present invention, when storing of image data for printing a first one band image by a first scanning has been completed, the recording means starts printing, and wherein when the recording means starts the printing for one band, the storage means generates a write address in a direction the same as that of a read address used in the printing, and stores image data for printing the next band image.

Thus, the recording means only waits for the completion of storing one-scanning image data into the memory means, and from the second scan-printing, actually it does not wait for the completion of storing image data. Since the wasteful operation is omitted in this manner, high-speed printing can be attained.

Further, according to another aspect of the present invention, the print head has a plurality of color print heads, respectively corresponding to a plurality of colors, arranged at predetermined intervals, and upon storing image data for one pixel, the storage means sequentially stores color component data for colors used in printing into the memory means, further, the recording means sequentially reads out the color component data from the memory means, delays the color component data based on the interval between the color print heads and a scanning speed of the print head, and supplies the delayed color component data to the respective color print heads. This avoids increase of apparatus size, while realizing a printing apparatus capable of color printing.

Further, the print head has a plurality of printing devices in a subscanning direction substantially orthogonal to a main-scanning direction in which the print head is scanned. This enables printing of an image having a certain width by one scanning.

Further, the printing apparatus further comprises: reading means for reading an original image by scanning a reading head having a reading width substantially the same as a width of a band image printed by one scanning by the print head; and reception means for receiving image data from an external apparatus, wherein the storage means stores the image data read by the reading means or the image data received by the reception means into the memory means. This enables the apparatus to function as a copying machine and as a printer connected to an external device.

Further, the printing apparatus further comprises an operation panel for instructing the performance of mirror-image printing. This omits operation and processing for mirror-image printing from image-data output side.

Still another aspect of this invention involves a printing apparatus which prints an image by scanning a print head in a main-scanning direction, the print head having plural printing elements aligned in a subscanning direction different from the main-scanning direction, wherein one band image, having a predetermined width in the subscanning direction, is printed by one scanning by the print head. The apparatus includes a memory means for storing image data to be used in one scanning by the print head, into a storage area, address generating means for generating write and read addresses for writing/reading of the image data to/from the memory means in the main-scanning direction, and write and read addresses for writing/reading of the image data to/from the memory means in the subscanning direction. In addition, the apparatus includes recording means for printing an image by reading the image data from the memory means in a direction for updating the read addresses opposite to a direction for updating the write address used when the image data was written into the memory means, and supplying the read image data to the print head, writing means for, during the printing by the recording means, storing image data to be used in a next one scanning by the print head into the storage area from which the image data for the band image has been read, while updating the write address in the predetermined direction, and reverse means for reversing the direction for updating the read/write address by every scanning by the print head.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a timing chart showing the relation between image data and clock signals;

FIG. 7 is an explanatory view showing the relation between the construction of the image memory and its addresses;

DETAILED DESCRIPTION OF THE PREFERRED EMBODIMENT(S)

Preferred embodiments of the present invention will be described in detail in accordance with the accompanying drawings.

[First Embodiment]
<Apparatus Configuration>

Figure 1:
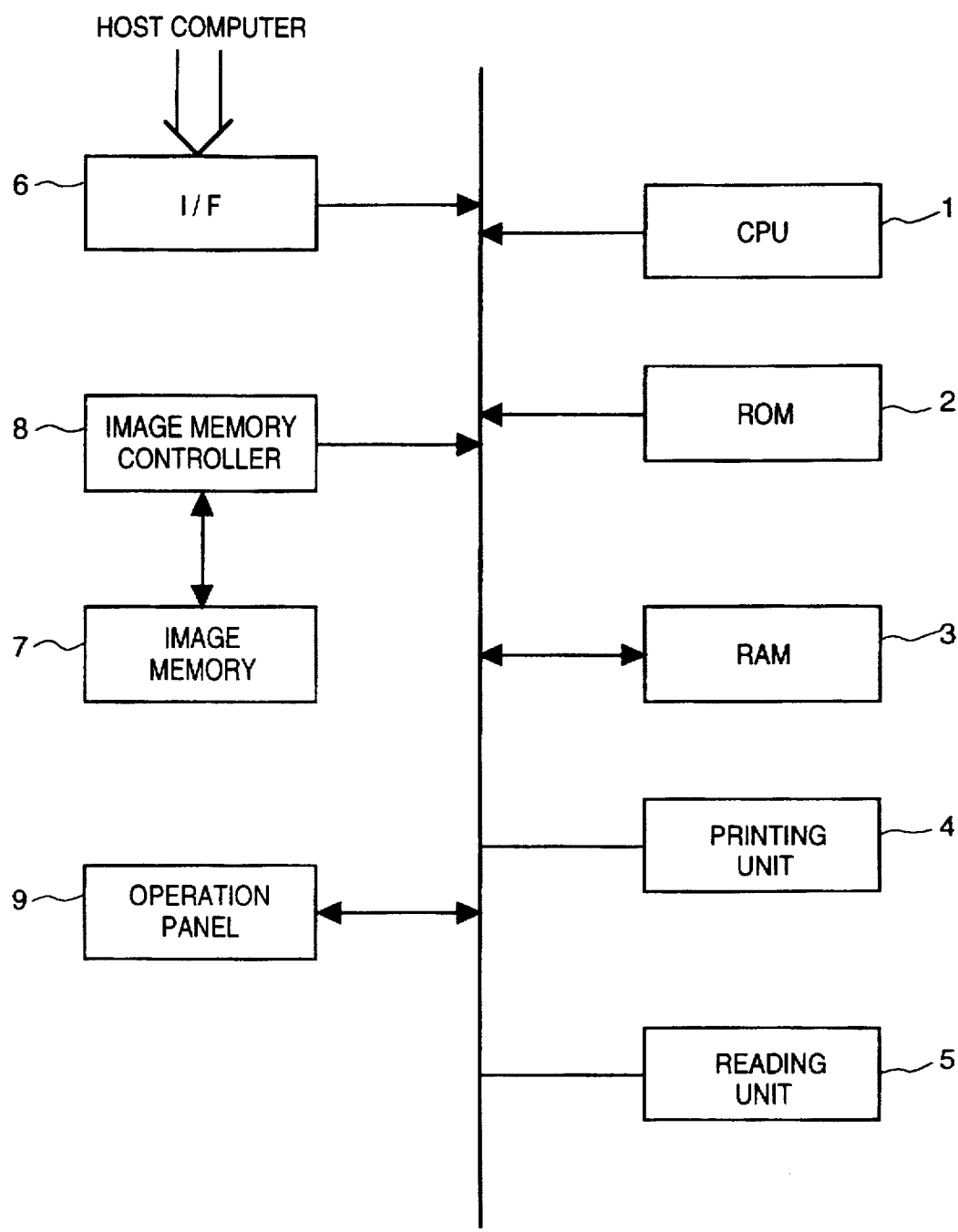
FIG. 1 is a block diagram showing the configuration of a printing apparatus according to a first embodiment of the present invention.

FIG. 1 shows the configuration of a copying apparatus according to a first embodiment of the present invention.

In FIG. 1, reference numeral 1 denotes a CPU which controls the overall apparatus; 2, a ROM in which operation processing procedures of the CPU 1 are stored; 3, a RAM used as a work area for the CPU 1; and 4, a printing unit which prints an image in band units by scan-moving a recording head. In this embodiment, the recording head is an ink-jet head, having an array of 128 ink-discharge nozzles, for discharging ink droplets by thermal energy. Numeral 5 denotes a reading unit which reads an original image in band units.

Numeral 6 denotes an interface for inputting image data from an external host computer connected to the apparatus as well as from the reading unit 5. That is the copying apparatus of this embodiment, connected to the host computer, functions as a general printer which performs printing based on image data received from the host computer.

Numeral 7 denotes an image memory for storing image data for one band from the recording head of the printing unit 4; 8, an image memory controller which controls writing/reading to/from the image memory under the control of the CPU 1; and 9, an operation panel having various switches for instructing various operations and a display unit for displaying simple messages.

Figure 2:
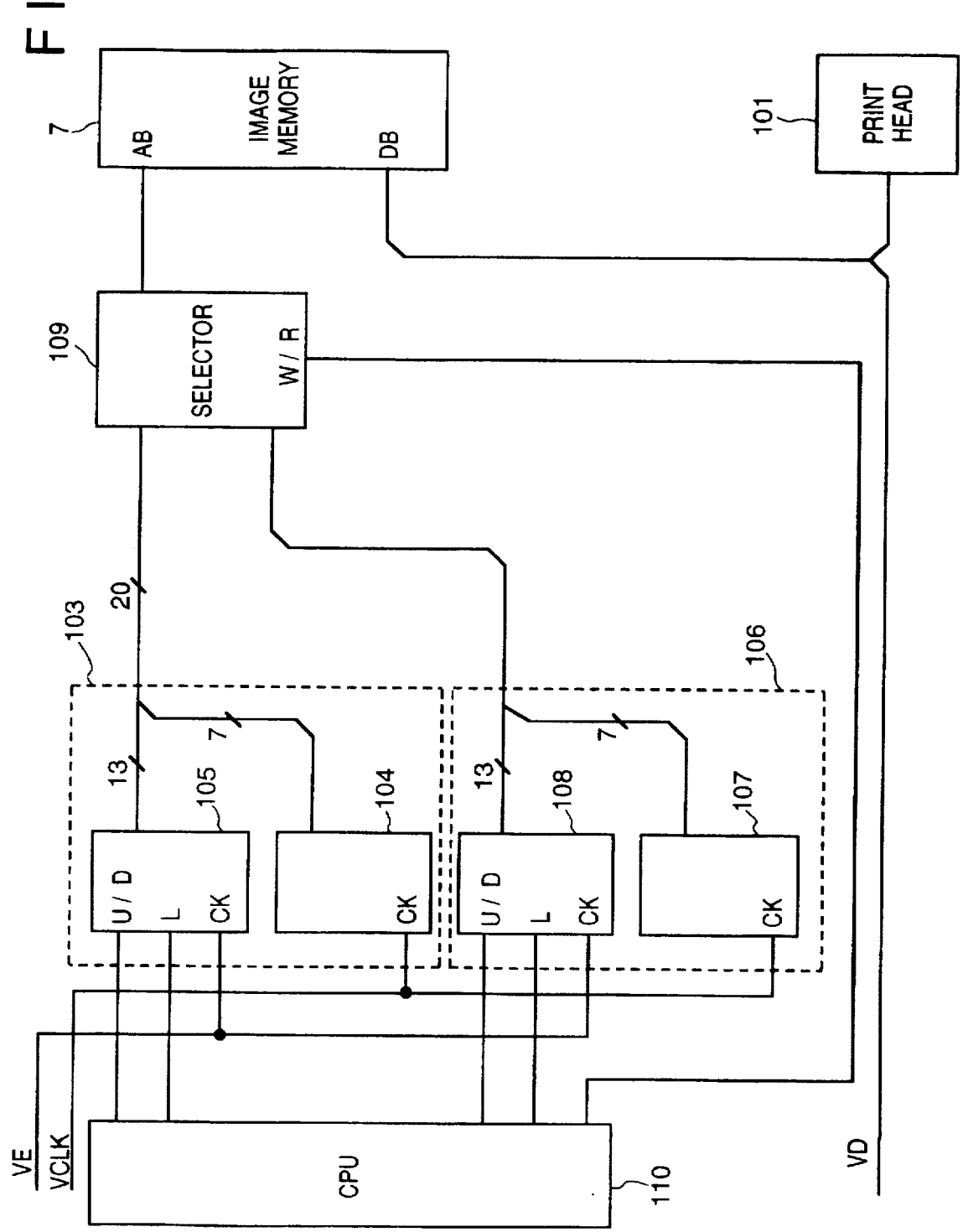
FIG. 2 is a block diagram showing the construction of an image memory, a print head and peripheral devices in the printing apparatus of the first embodiment.

FIG. 2 shows the construction of the CPU 1, the image memory 7, the image memory controller 8 and the printing unit 4.

In FIG. 2, numeral 101 denotes a binary print head which discharges ink droplets, in accordance with the bubble-jet (BJ) method utilizing bubbles generated by film boiling with a heat-generating device. As described above, the print head 101 has the array of 128 ink-discharge nozzles. The image memory 7 has a capacity for storing binary image data of (number of print pixels in a vertical direction(=direction along the ink-discharge nozzle array))×(number of print pixels in a horizontal direction). Assuming that the horizontal printing length is 297 mm, corresponding to the shorter length of an A4-size recording sheet, and that the printing pixel density is 400 dot/25.4 mm, the number of print pixels is:

297×400/25.4=about 5 Kbits

At this time, taking hardware requirement into account, a memory capacity for 8 Kbits (address 13 bits) is required. Since the number of print pixels is 128, the hole capacity of the image memory 7 is:

128×8 K=1 Mbits.

Thus, a 1 Mbit DRAM is employed as the image memory 7.

Numeral 103 denotes a write-address counter for generating an address for writing image data VD into the image memory 7. Similarly, numeral 106 denotes a read-address counter for generating an address for reading the image data VD out of the image memory 7 to the print head 101.

In the write-address counter 103, numeral 104 denotes a vertical write-pixel counter for inputting an image synchronizing clock VCLK generated by one pixel to count the number of print pixels in a vertical direction along the array of ink-discharge nozzles. Since the print head 101 has 128 ink-discharge nozzles, the number of bits for an output address is 7 bits. Numeral 105 denotes a horizontal write-pixel counter for inputting a print-head enable signal VE to count the number of print pixels in the horizontal direction (the number of pixel columns). As described above, the horizontal write-pixel counter 105 outputs 13 bits as a write address.

On the other hand, in the read-address counter 106, numeral 107 denotes a vertical read-pixel counter (7 bit output) for inputting the image synchronizing clock VCLK generated by one pixel to count the number of print pixels in the vertical direction. Numeral 18 denotes a horizontal read-pixel counter (13 bit output) for inputting the print-head enable signal VE to count the number of print pixels in the horizontal direction.

In the present embodiment, the pixel counters 104 and 107 are both 7-bit output counters and only for incremental counting (count up). The pixel counters 105 and 108 are both 13-bit output counters and available for incremental counting or decremental counting (count down) in correspondence with a logic level of a control signal provided to a "U/D" terminal of the respective counters. The address counters 103 and 106 both have a 20-bit output width containing the 7 bits of the pixel counters 104 and 107 as lower bits and the 13 bits of the pixel counters 105 and 108 as upper bits.

Numeral 109 denotes a selector for selecting the output from the write-address counter 103 or the output from the read-address counter 106 in a time-divisional manner and outputting the selected address to an address input terminal of the image memory 7.

In the above construction, the write-address counter 103, the read-address counter 106 and the selector 109 form the image memory controller 8.

<Image Printing>

Next, image printing operation of the copying apparatus of the present embodiment having the above construction will be described below.

First, image formation in normal copying will be described with reference to FIG. 5.

Figure 3:
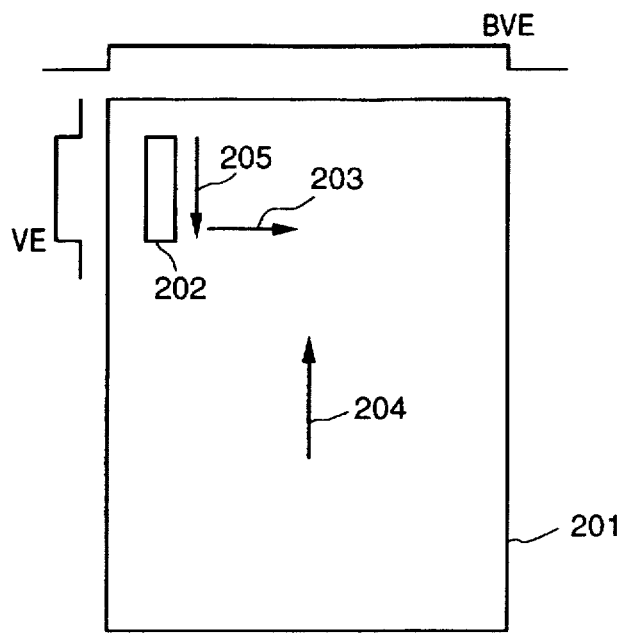
FIG. 3 is an explanatory view showing printing operation of the printing apparatus of the first embodiment.
Figure 4:
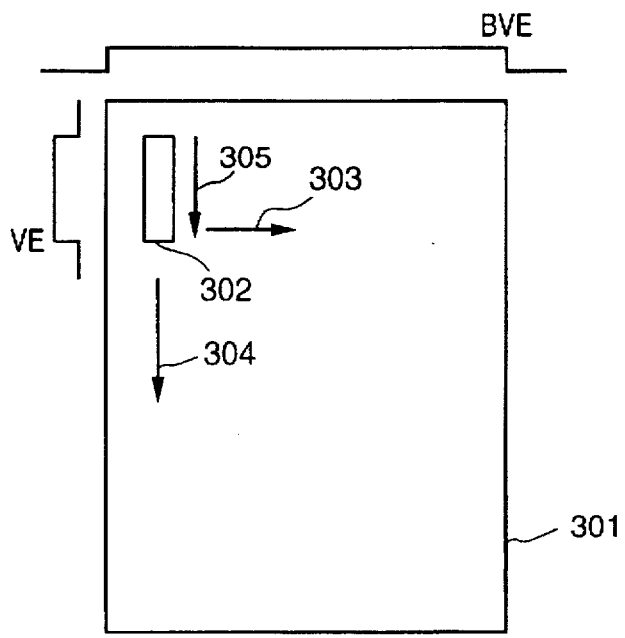
FIG. 4 is an explanatory view showing reading operation of the printing apparatus of the first embodiment.

As shown in FIG. 5, the image data VD is inputted in synchronization with the image synchronizing clock VCLK. Then, the input image data, not stored in the image memory 7, is transferred to the print head 101 for perform printing as shown in FIG. 3. Thus, normal image formation is made.

The speed of transferring image data via the interface 6 is much faster than the printing speed, therefore a fast transfer clock is used for the write-address counter to write the image data into the image memory 7, and a slow print clock is used for the read-address counter. In this case, reading is not necessarily suspended by the completion of writing for one band so far as the reading follows the writing. For example, as the read clock is slower than the transfer clock, reading and writing may be started at the same time.

Note that when normal copying is performed or when an image is simply printed based on image data received from the host computer, a count-up/count-down control signal (U/D) to be supplied to the write-address counter 103 and the read-address counter 106 is instructing incremental counting.

Next, mirror-image formation will be described below.

FIG. 7 shows the image memory 7 used in mirror-image printing. As shown in FIG. 5, the image data VD is inputted in synchronization with the image synchronizing clock VCLK.

Upon writing, the vertical write-pixel 104 starts incremental counting from "0" by the clock VCLK, and the horizontal write-pixel counter 105 starts incremental counting from "0" by the print head enable signal VE. The selector 109 selects the output from the write-address counter 103 and inputs the data into the image memory 7. As a result, memory addresses of the image data are, in the order of (a horizontal pixel counter value, a vertical pixel counter value), as shown in FIG. 7, (0000H, 00H) for data VD1, (0000H, 01H) for data VD2, (0000H, 02H) for data VD3, . . . , (0000H, 7FH) for VD128, (0001H, 00H) for VD129, . . . , (0002H, 00H) for VD257, . . . (H means hexadecimal number). As the writing of one-band image data has been completed, reading operation is started.

Figure 6A:
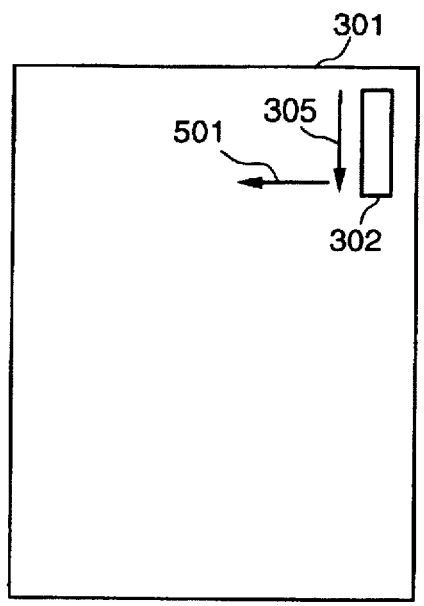
FIGS. 6A and 6B are explanatory views showing conventional image reading operation upon mirror-image formation.
Figure 6B:
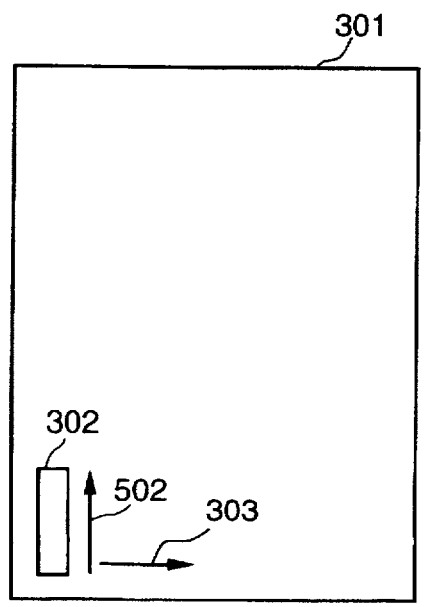

In the reading, the horizontal read-pixel counter 108 starts decremental counting from the value of the horizontal write-pixel counter 105, while the vertical read-pixel counter 107 starts incremental counting from "0". As a result, if the latest value of the horizontal write-pixel counter 105 is "1245H" as shown in FIG. 6, the reading is performed with the following addresses (1245H, 00H), (1245H, 01H), . . . , (1245H, 7F), (1244H, 00H), . . . , (1244H, 01H), . . . .

The read image data are transferred to the print head 101 which performs printing as shown in FIG. 2, thus a mirror image is formed.

In this mirror-image formation, the reading from the image memory 7 is started after the completion of writing of first one-band image data. However, the next writing may be started before the completion of the current band-image reading. For example, if the reading is made in accordance with decremental counting, the horizontal write-pixel counter 105 is set to start decremental counting, and the next writing is started from the value of the horizontal write-pixel counter 105 at a point where the previous writing was completed (i.e., a point where the reading was started). Thus, even though reading for one band is not completed, the next writing can be started. More specifically, assuming that one-band image data A, B, C, . . . are read and written in the following order:

Write A (U), Read A (D)
Write B (D), Read B (U)
Write C (U), Read C (D)
:

the reception of the image data upon copying or image data outputted from the host computer is smoothly made. Further, this saves processing time. Note that if a mirror image is printed based on image data from the host computer, read addresses and write addresses should be monitored since write address outputting might catch up with read address outputting. Accordingly, even in copying, if image reading speed is the same as printing speed or faster than the printing speed, it is determined as to only whether or not write address outputting has caught up with read address output.

The mirror-image printing is instructed from the operation panel 9. More specifically, selection of normal copying/mirror-image copying in copying mode, and normal printing/mirror-image printing in a printer mode where the apparatus functions as an external printer of the connected host computer are made with switches at the operation panel 9.

Figure 8:
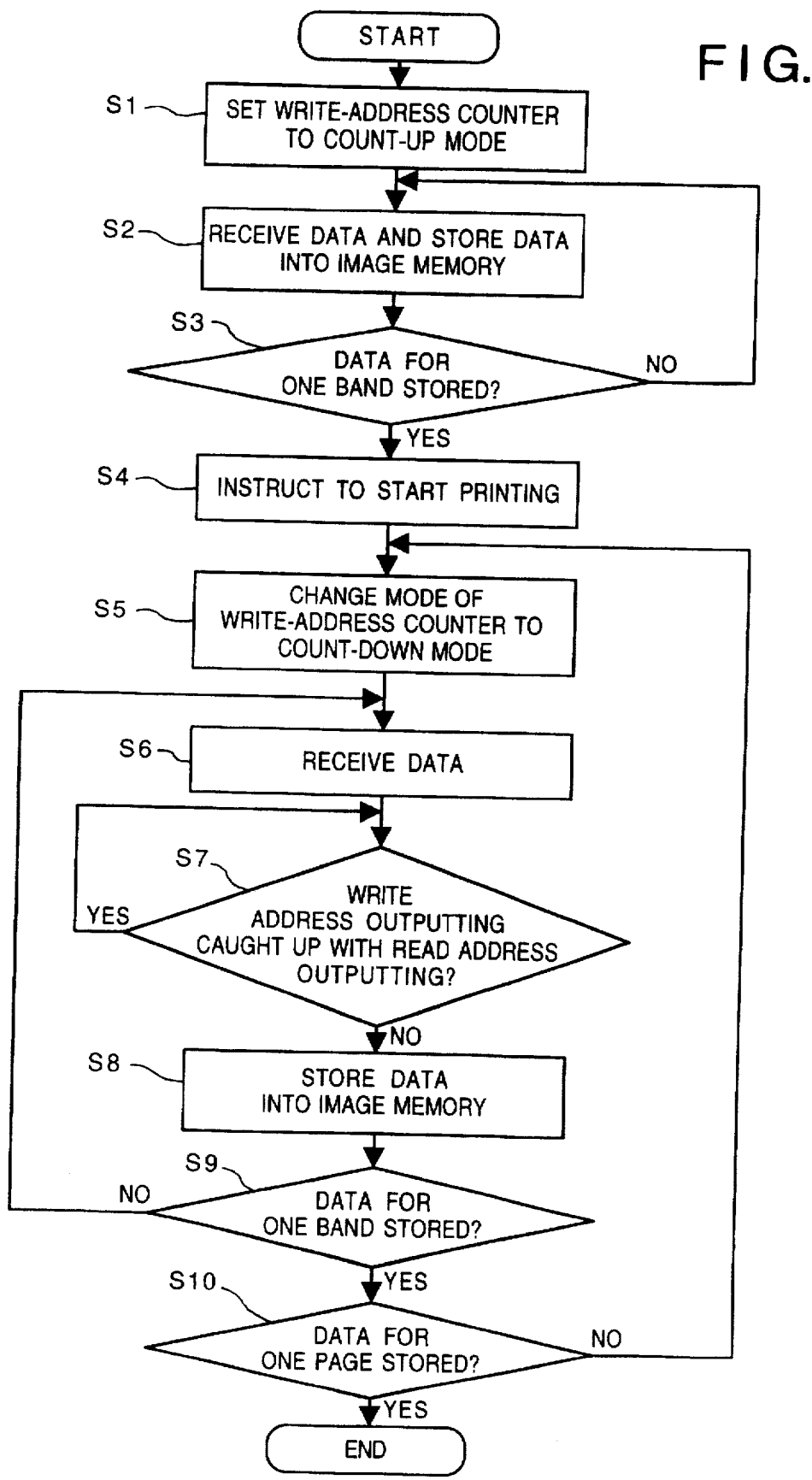
FIG. 8 is a flowchart showing reception processing in mirror-image printing, according to the first embodiment.
Figure 9:
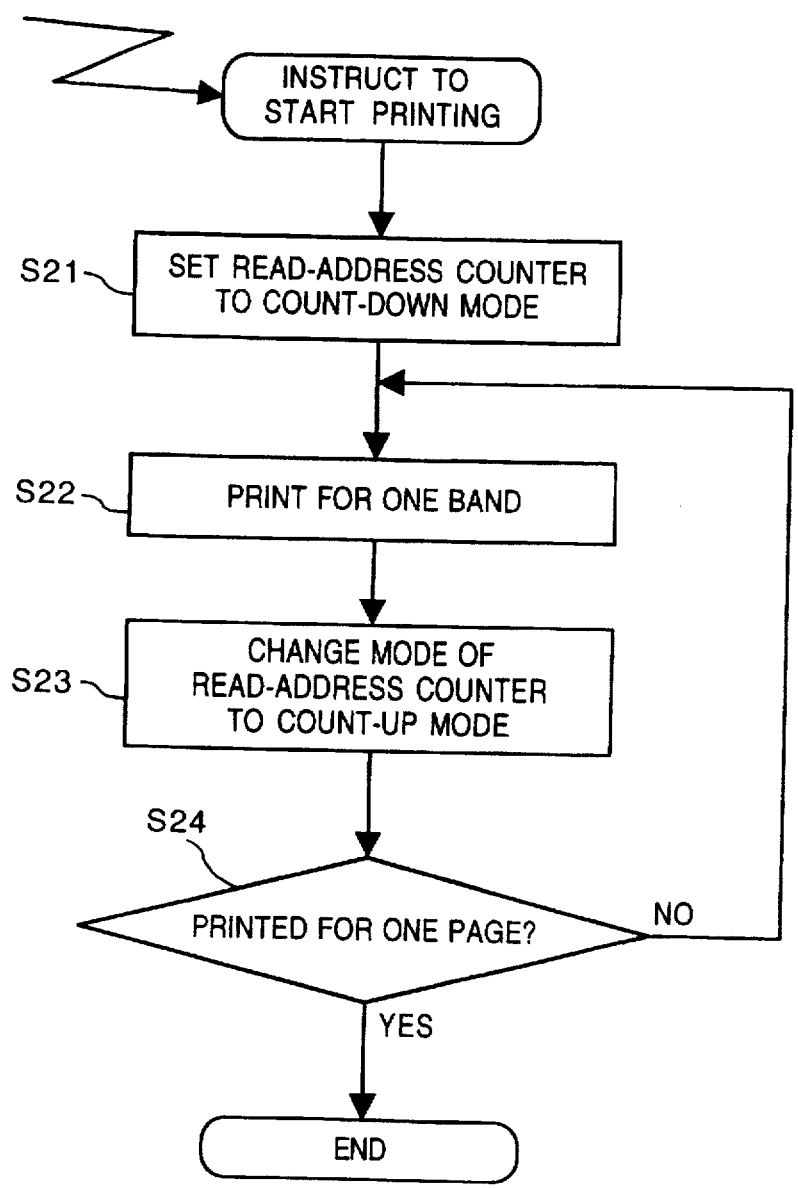
FIG. 9 is a flowchart showing printing processing in the mirror-image printing, according to the first embodiment.

FIGS. 8 and 9 show image-data reception processing and printing processing in a case were the apparatus functions as a printer of the host computer and mirror-image printing is designated. In this example, the write-address counter 103 for writing data into the image memory 7 and the read-address counter 106 for reading data from the image memory 7 perform any of the above-described incremental counting and decremental counting, and count-up/count-down mode may be changed in band units. Further, the speed of transferring print-data from the host computer is sufficiently fast with respect to the printing speed of the printing unit 4.

First, in step S1, the write-address counter 103 is set to the count-up mode, and in step S2, image data from the host computer is received, and stored into the image memory 7 in accordance with the write-address counter value at the point. This processing is repeated until it is determined in step S3 that image data for one band has been stored in the image memory 7.

As the initial one-band image data has been stored in the image memory 7, the process proceeds to step S4, in which an instruction to start printing processing is issued to the printing unit 4. Then, the printing unit 4 performs printing based on the data stored in the image memory 7, in accordance with the flowchart in FIG. 9 to be described later.

As described above, when the printing start instruction is issued to the printing unit 4, the printing unit 4 starts printing for one band in accordance with a decremental read-address counter value (FIG. 9). Accordingly, image data used for printing occurs from the uppermost address of the image memory 7. As this image data is not used any more, the mode of the write-address counter 103 is changed to an opposite mode (count-down mode in this case) in step S5.

As the write-address counter mode is changed, reception of the next one-band image data is ready, then, the next image data is received in step S6. Note that whether or not the reception of the next data has caught up with outputting of a read address is determined in step S7, and if YES, updating of the read-address counter value is awaited, while a busy signal is outputted to the host computer.

If read-address outputting is preceding to write-address outputting, the process proceeds to step S7, in which the received data is stored into the image memory 7.

In step S9, whether or not storing image data for one band has not been completed is determined. If NO in step S9, the steps S6 to S8 are repeated.

If YES in step S9, whether or not reception of image data for one page has been completed is determined step S10. If NO, the process returns to step S5, in which the mode of the write-address counter 103 is changed to an opposite mode, and steps S6 to S9 are repeated.

In this processing, printing is started after storing the initial one-band image data is completed, thereafter, the following received data are sequentially stored in address positions for image data already used for printing. Thus, image memory 7 always contains print data during printing, therefore, the printing unit 4 can perform printing without interval due to storing image data into the image memory 7.

Next, the operation of the printing unit 4 that has received the printing start instruction in step S4 will be described with reference to the flowchart in FIG. 9.

First, in step S21, the read-address counter 106 is set to the count-down mode with the latest count value as an initial value. In step S22, printing for one band is performed, and when the printing for one band is completed, the mode of the read-address counter is changed to an opposite mode in step S23 for printing the next band. Steps S22 and S23 are repeated until it is determined that printing for one page has been completed in step S24.

The above printing is made based on print data from the host computer, designated from the operation panel 9 by selecting the printer mode (otherwise, by releasing the copying mode) and instructing the mirror-image printing, however, this printing is performed basically in the same manner when the mirror-image printing in copying mode is selected.

The mirror-image printing is designated from the operation panel 9, however, the mirror-image printing may be designated from the host computer by outputting a predetermined command before outputting print data. In this case, the host computer requires a program for receiving an instruction as to mirror-image printing/normal printing, and a program for, upon reception of mirror-image printing instruction, outputting a command indicative of the mirror-image printing to the apparatus. In case it is difficult to provide these programs in the host computer, it is better that the designation can be made on the apparatus side since the host computer can be used without any change in its programming.

It should be noted that in the present embodiment, the present invention is applied to a copying machine, however, the present invention is applicable to a normal printer by adding the above-described mirror-image printing mode, since controlling writing/reading of image data to/from an image memory reduces wasteful operation and achieves high-speed printing.

In the present embodiment, an initial count value of the address counters is fixedly the uppermost address of the image memory (i.e., the size of recording sheet is fixed), however, the counter initial value may be changed in correspondence with the size of recording sheet designated upon copying or instructed from the host computer. For this purpose, it may be arranged that initial values of the respective counters are arbitrarily changed. Updating of counter value is well known and easily understood by a person skilled in the art, therefore the explanation of this technique will be omitted.

Further, processing in case of normal copying and that in case of normal printing are easily understood by a person skilled in the art from the above description.

In the present embodiment, writing/reading of data into the image memory 7 is realized by using address counters in synchronization with a predetermined clock, however, the writing/reading may be realized by using software. Especially, in a case where the speed of receiving data from the host computer (data transfer speed) is not constant, the address counter value will be updated based the a writing instruction from the CPU. This will be applied to the following other embodiments.

[Second Embodiment]

Figure 10:
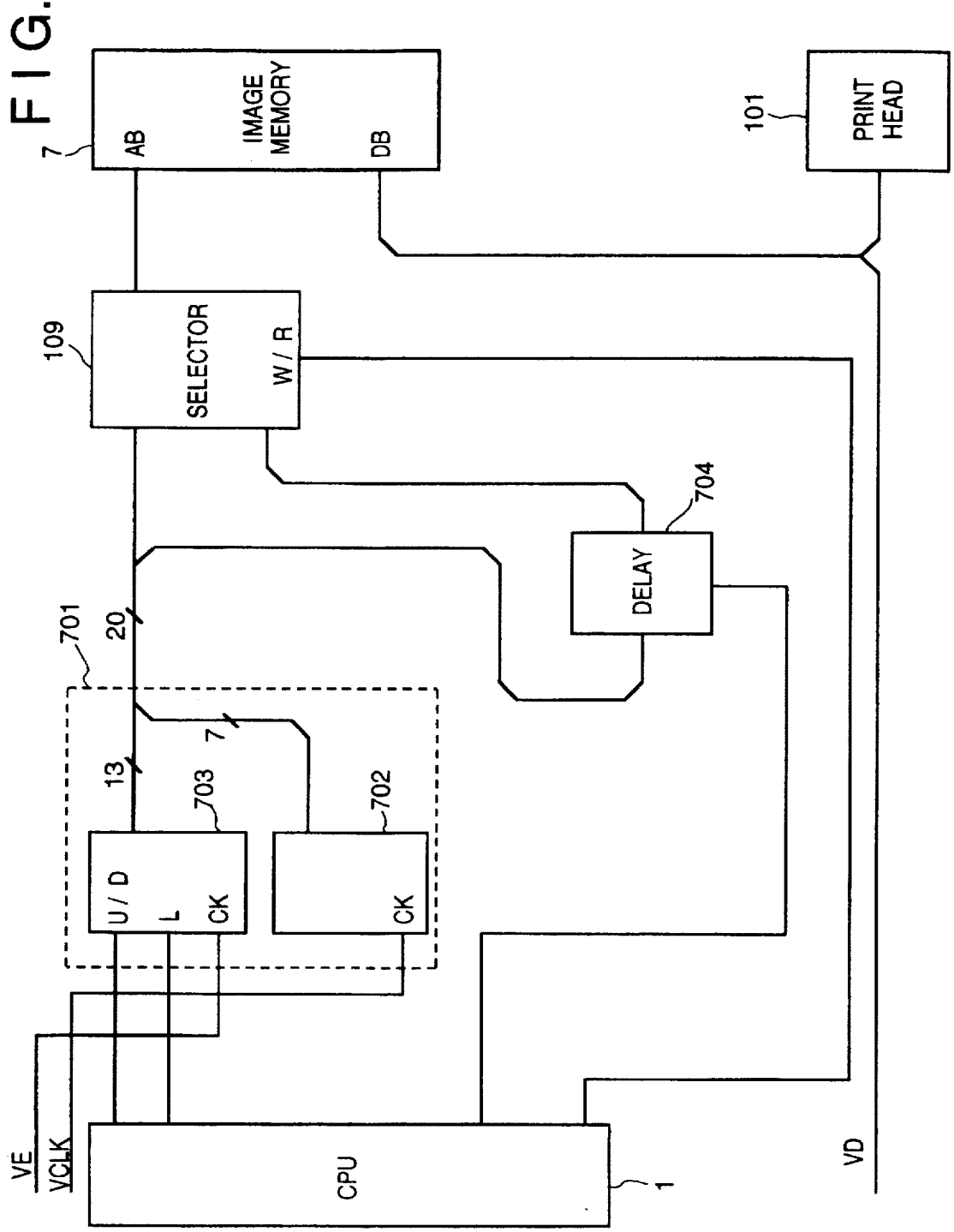
FIG. 10 is a block diagram showing the construction of an image memory, a print head and peripheral devices in a printing apparatus according to a second embodiment.

Next, a second embodiment of the present invention will be described with reference to FIG. 10. In FIG. 10, elements having the same functions as those in FIG. 2 have the same reference numerals and the explanations of these elements will be omitted.

Numeral 701 denotes an address counter which generates an address for writing image data VD into the image memory 7 and an address for reading the image data from the image memory 7 to transfer the image data to the print head 101; 702, a vertical pixel counter, in which the image synchronizing clock VCLK generated by one pixel is inputted, for counting a number of print pixels in the vertical direction; and 703, a horizontal pixel counter, in which the print head enable signal VE is inputted, for counting a number of print pixels in the horizontal direction.

In the second embodiment, the vertical pixel counter 702 is 7-bit output counter only for incremental counting. The horizontal pixel counter 703 is a 13-bit output counter for both incremental and decremental counting. The address counter 701 has a 20 bit output width, with 7 bits of the counter 702 as lower bits and 13 bits of the counter 703 as upper bits.

Numeral 704 denotes a delay circuit which inputs output from the address counter 701 and outputs data after an appropriate delay time, at least a period corresponding to 1 VCLK.

Numeral 109 denotes a selector which selects one of the output from the address counter 701 or the output from the delay circuit 704, and outputs data to an address input of the image memory 7.

In this embodiment, the selector 109 is controlled to select output from the delay circuit 704 upon writing image data into the image memory 7, while select output from the address counter 701 upon reading image data from the image memory 7.

Next, mirror-image formation according to the second embodiment will be described below.

First, image for one band is written into the image memory 7. At this time, the horizontal pixel counter 703 performs incremental counting, and the selector 109 selects output from the delay circuit 704. However, regarding writing of the first band image data, any of output from address counter and output from the delay circuit may be selected.

Next, writing of the second band image data is performed while the stored first band image data is reading out. At this time, the horizontal pixel counter 703 performs decremental counting. The selector 109 outputs a value of the address counter 704 into the image memory 7, upon reading, and outputs an address counter value delayed by the delay circuit into the image memory 7. Thus, image data is written into an area, from which the previously stored data has been read and which is currently available. The above operation repeats from the second band image reading, however, the horizontal pixel counter 703 performs incremental counting and count-up/count-down mode is changed over at each writing/reading operation.

In comparison with the first embodiment, the second embodiment simplifies the construction of apparatus. Note that the overall apparatus construction is the same as that shown in FIG. 1, and instruction of mirror-image printing is the same as that in the first embodiment.

[Third Embodiment]

Next, a third embodiment of the present invention will be described with reference to FIG. 11. In the third embodiment, the apparatus has cyan (C), magenta (M), yellow (Y) and black (K) print heads for printing color images.

Figure 11:
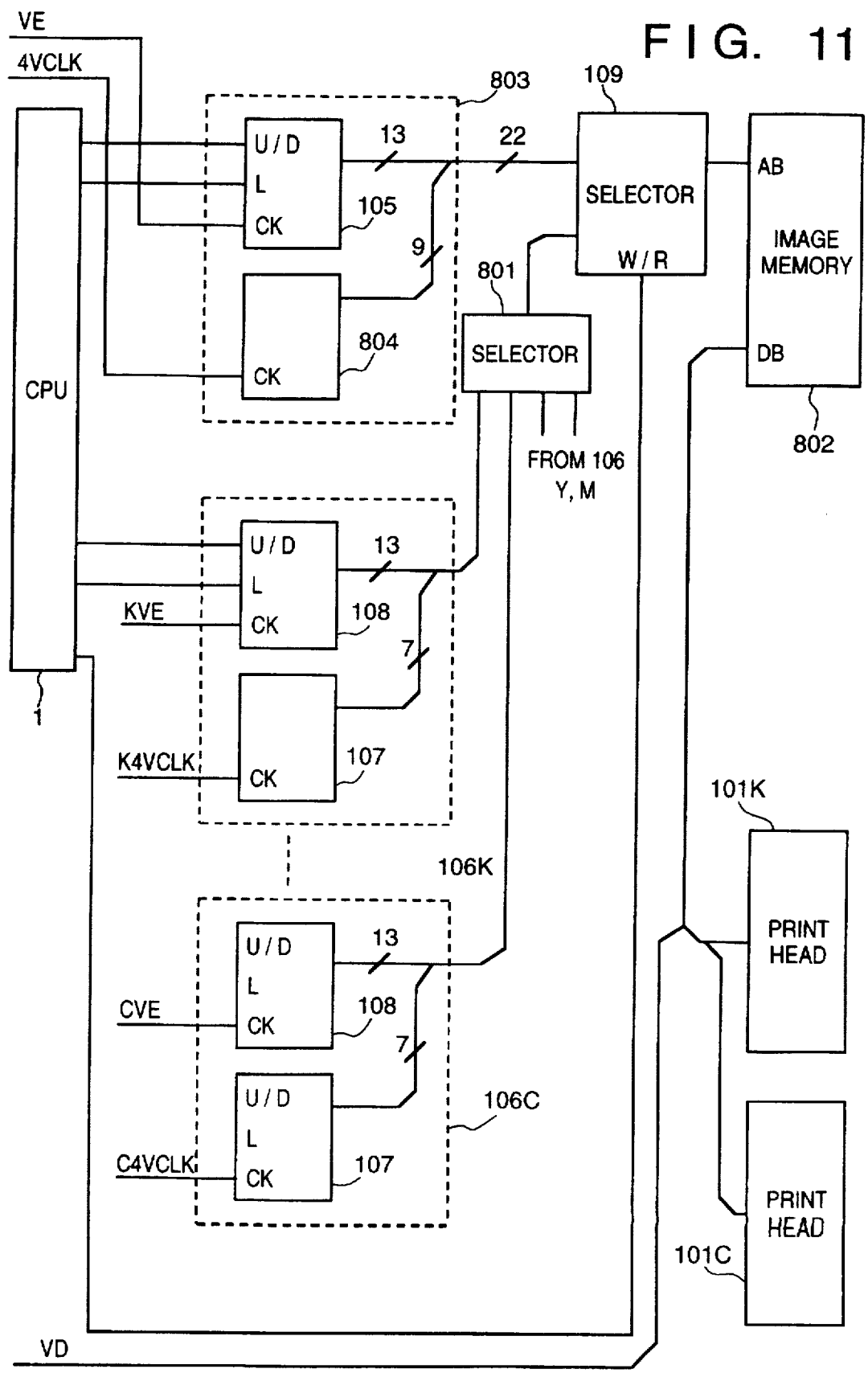
FIG. 11 is a block diagram showing the construction of an image memory, a print head and peripheral devices in a printing apparatus according to a third embodiment.

FIG. 11 shows the construction of the apparatus according to the third embodiment, that forms a color image using the four print heads for the respective C, M, Y and K colors. In FIG. 11, the elements corresponding to those in FIG. 1 have the same reference numerals.

Numerals 101K, 101C, 101M and 101Y denote print heads (print heads 101M and 101Y are not shown), each having the same construction as that of the print head 101 in FIG. 2, respectively for K, C, M and Y colors; and 106K, 106C, 106M and 106Y, address counters, each having the same construction as that of the read-address counter 106, for reading K, C, M and Y color data. The respective color-data reading address counters operate with respective color VCLK's and respective color data VE's such as KVCLK and KVE. Numeral 801 denotes a selector which selects the respective address counter values in a time-divisional manner, adds 2 bits to the selected value and outputs the value; 802, a memory capable of storing binary image of (number of printing devices)×(number of pixels in a horizontal direction)×(4 colors).

In this embodiment, the printable length in the horizontal direction is 297 mm, i.e., the shorter side of an A3 sized recording sheet, and the printing pixel density is 400 dot/ 25.4 mm. As the number of colors is four, the image memory is a 4 Mbit DRAM. Numeral 803 denotes a write-address counter having a similar construction to that of the write-address counter 103 in FIG. 2, however, the counter 803 inputs 4VCLK instead of the VCLK, and the output width of a vertical write-pixel counter 804 is 9 bit (for four colors) instead of 7 bit width, thus the write-address counter 103 has a total 22 bit output width.

First, normal image formation of the apparatus according to the third embodiment will be described with reference to FIG. 12.

Figure 12:
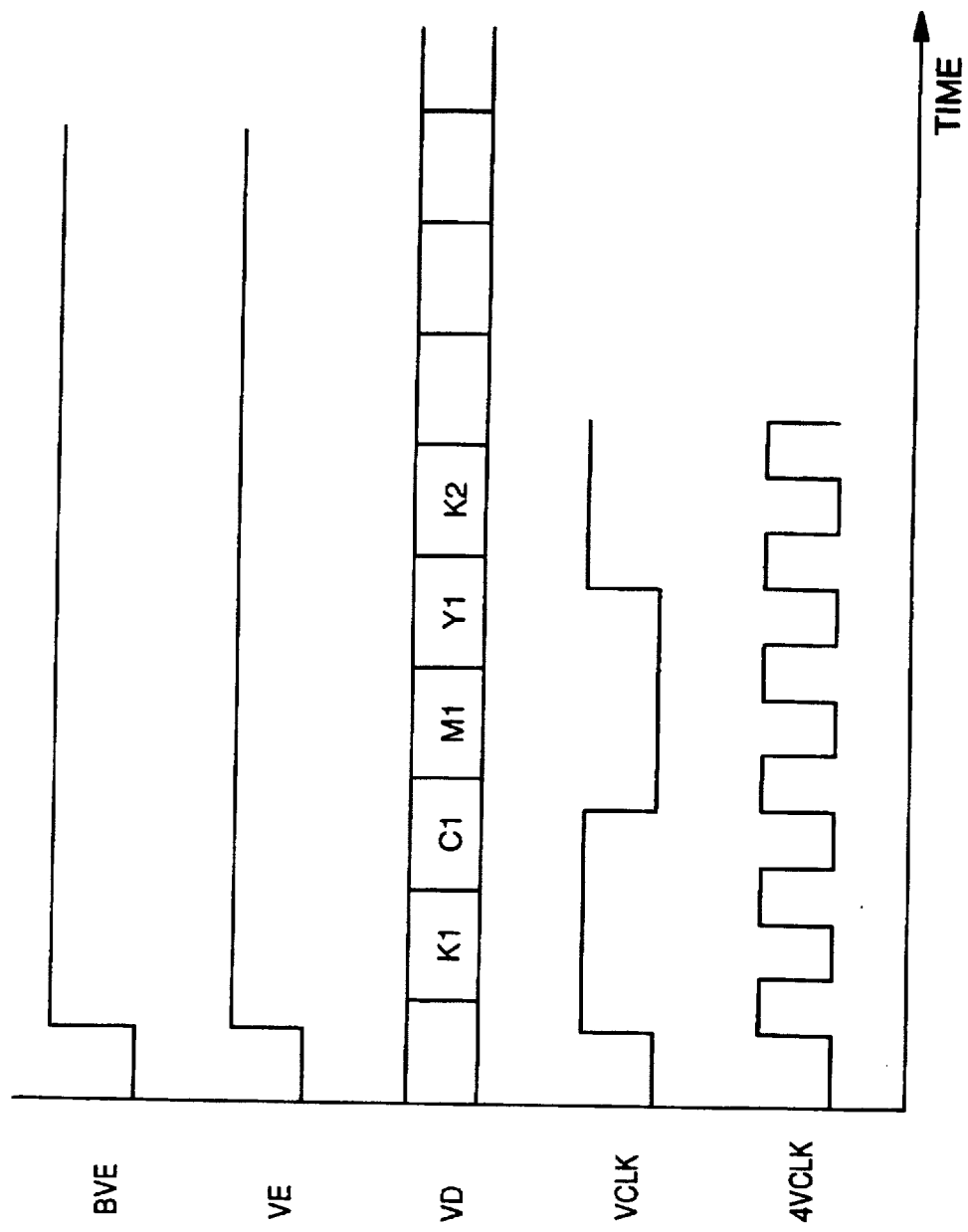
FIG. 12 is a timing chart showing the relation between image data and clock signals VCLK and 4VCLK in the third embodiment.

As shown in FIG. 12, upon normal color image formation, the respective K, C, M and Y color component data are serially transferred in a time-divisional manner. A transfer clock VCLK is used for transferring the KCMY data as one set in pixel units, and a transfer clock 4VCLK is used for transferring each color pixel in pixel units.

Upon writing, the vertical write-pixel counter 804 performs incremental counting by the 4VCLK by each pixel, thus respective color image data K1, C1, M1, Y1, K2, . . . are sequentially stored in the image memory 802.

Next, reading operation will be described with reference to FIGS. 13 and 14.

Figure 13:
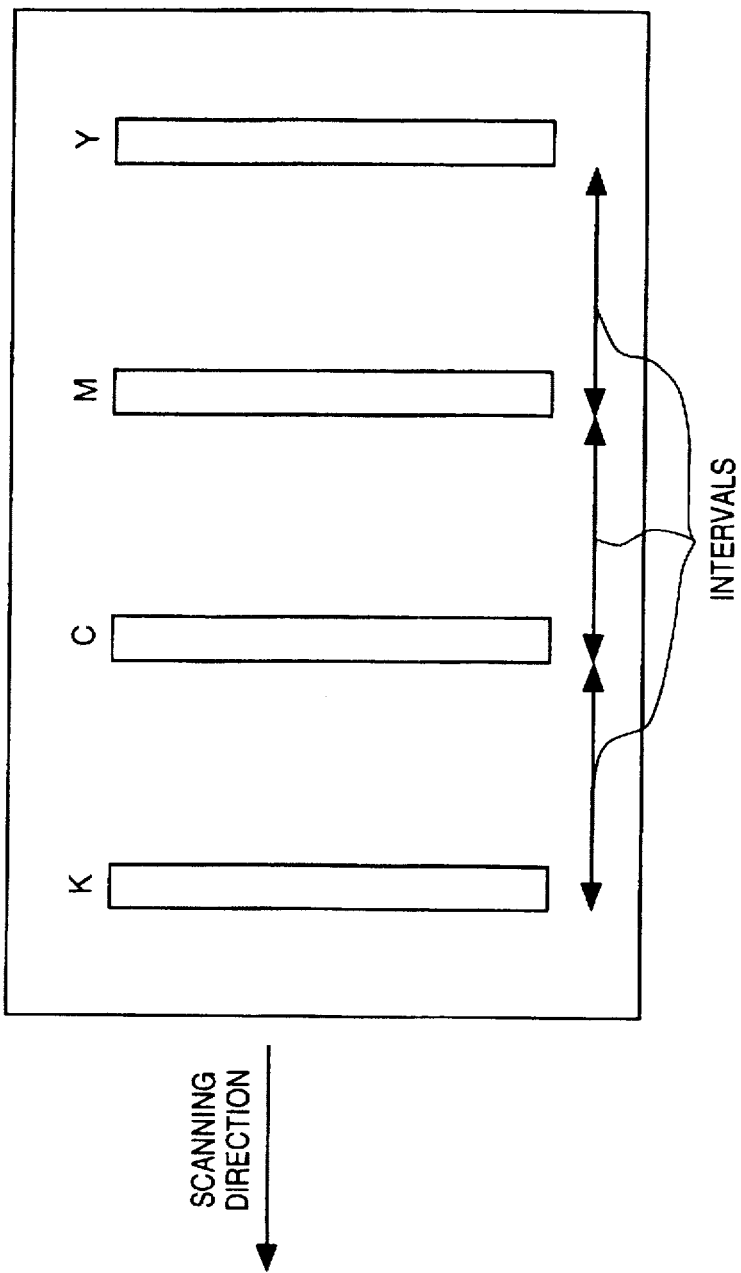
FIG. 13 is an explanatory view showing four print heads in the third embodiment.
Figure 14:
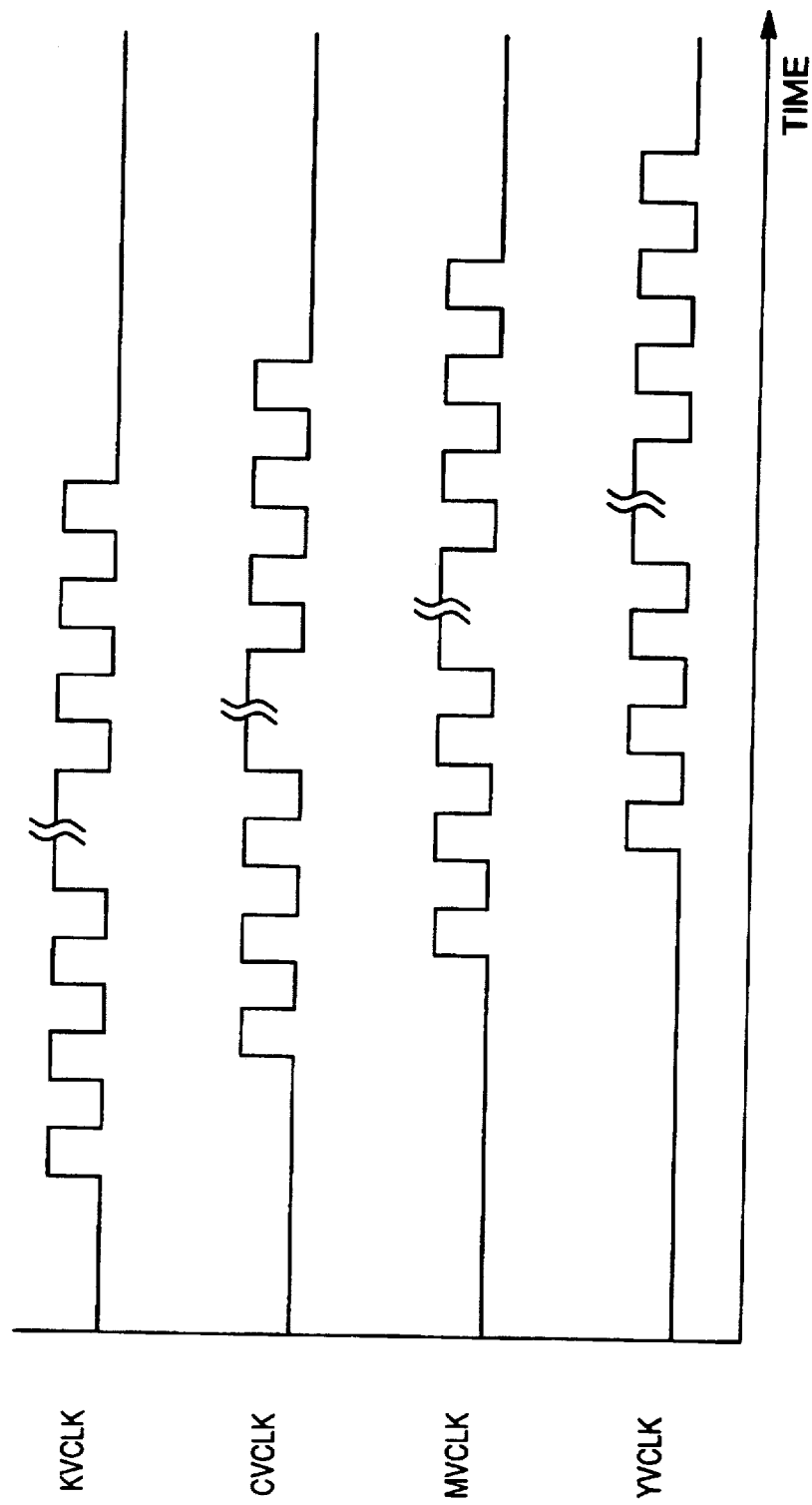
FIG. 14 is a timing chart showing delayed VCLK's of respective colors.

As shown in FIG. 13, as the K, C, M and Y print heads are arranged at predetermined intervals, the sequentially-stored K1, C1, M1, Y1, . . . data must be read with delay corresponding to the interval. As shown in FIG. 14, if the printing order is KCMY, the reading is also made in the order of K, C, M and Y data with delay, from the memory 802. In this manner, image data are read with a delay time corresponding to the interval between the print heads, to the respective color print heads, and normal color image is formed.

On the other hand, upon mirror-image formation, similar to the first embodiment, writing is made in the same manner as that of writing in normal image formation. However, upon reading, count-up/count-down mode of the horizontal read-pixel counter is changed to an opposite mode to that in writing.

In this manner, mirror-image formation is possible by increasing the memory capacity for correcting the positions of the print heads to a capacity for (number of printing devices)×(number of pixels in horizontal direction)×(number of colors (4)).

It should be noted that the overall construction of the third embodiment is substantially the same as that in FIG. 1. Accordingly, input means for inputting a color image is a host computer as well as the reading unit 5. As described in the first and second embodiments, the present invention is applicable to a color printer as well as to a copying machine. Further, similar to the first embodiment, mirror-image printing may be instructed from the operation panel 9.

As described above, the copying apparatus of the present invention comprises a print head having an array of printing devices, an image memory capable of storing image data for (number of printing devices)×(number of print pixels in horizontal direction), an address counter which generates an address for writing image data into the image memory and an address for reading image data from the image memory, and a controller for controlling the image memory and the address counter. Further, the address counter has a vertical pixel counter for counting a number of pixels in a vertical direction along the printing device array and a horizontal counter for counting a number of pixels in a horizontal direction orthogonal to the vertical direction.

Further, the horizontal pixel counter is capable of both incremental and decremental counting.

Thus, the apparatus having the above construction solves the problems in the conventional mirror-image printing, without enlarging the apparatus size, by printing by moving the printing device array in the horizontal direction orthogonal to the vertical direction along the printing device array. Further, the apparatus prints a mirror image in the same direction as in a direction in which a normal printout image is outputted. In addition, the apparatus can perform mirror-image printing based on image data from an external device such as a host computer.

As described above, the present invention enables mirror-image formation with preventing enlarging the apparatus size.

The present invention is not limited to the above embodiments and various changes and modifications can be made within the spirit and scope of the present invention. Therefore, to appraise the public of the scope of the present invention, the following claims are made.

What is claimed is:

1. A printing apparatus which prints an image in band units, by scanning a print head having a plurality of printing elements, comprising:

memory means for storing image data for one band image to be printed by one scanning by said print head;

recording means for performing printing by said print head, by reading image data stored in a storage area of said memory means designated by a read address, while updating the read address in a predetermined direction, and supplying the read image data to said print head;

writing means for, during the printing by said recording means, storing image data for a next band image to be printed by next one scanning by said print head into the storage area of said memory means from which the image data for the band image has been read by said recording means, while updating a write address in the predetermined direction; and reverse means for reversing the predetermined direction for updating the read address after the printing of the band image by the one scanning by said print head and writing the image data for the next band image by said writing means have been completed.

2. A printing apparatus which prints an image in band units, by scanning a print head having a plurality of printing elements, comprising:

memory means for storing image data for one band image to be printed by one scanning by said print head;

recording means for performing printing by said print head, by reading image data stored in a storage area of said memory means designated by a read address, while updating the read address in a predetermined direction, and supplying the read image data to said print head;

writing means for, during the printing by said recording means, storing image data for a next band image to be printed by next one scanning by said print head into the storage area of said memory means from which the image data for the band image has been read by said recording means, while updating a write address in the predetermined direction; and reverse means for reversing the predetermined direction for updating the read address after the printing of the band image by the one scanning by said print head and writing the image data for the next band image by said writing means have been completed, wherein when image data for first band image to be printed by a first scanning by said print head has been stored into said memory means at a storage area designated by the read address, said recording means starts printing, and wherein when said recording means starts the printing, said writing means generates a write address in a direction the same as a direction for updating the read address, and stores the image data for the next band image.

3. A printing apparatus which prints an image in band units, by scanning a print head having a plurality of printing elements, wherein said print head comprises a plurality of color print heads, respectively corresponding to a plurality of colors, arranged at predetermined intervals, comprising:

memory means for storing image data for one band image to be printed by one scanning by said print head;

recording means for performing printing by said print head, by reading image data stored in a storage area of said memory means designated by a read address, while updating the read address in a predetermined direction, and supplying the read image data to said print head;

writing means for, during the printing by said recording means, storing image data for a next band image to be printed by next one scanning by said print head into the storage area of said memory means from which the image data for the band image has been read by said recording means, while updating a write address in the predetermined direction; and reverse means for reversing the predetermined direction for updating the read address after the printing of the band image by the one scanning by said print head and writing the image data for the next band image by said writing means have been completed, wherein upon storing image data for one pixel, said writing means sequentially stores color component data corresponding to colors used in printing into said memory means, and said recording means sequentially reads out the color component data from said memory means, delays the color component data based on the interval between the color print heads and a scanning speed of said print head, and supplies the delayed color component data to the respective color print heads.

4. The printing apparatus according to claim 1, wherein said print head has a plurality of printing devices in a subscanning direction substantially vertical to a main-scanning direction in which the print head is scanned.

5. The printing apparatus according to claim 1, further comprising:

reading means for reading an original image by scanning a reading head having a reading width substantially the same as a width of a band image printed by one scanning by said print head; and reception means for receiving image data from an external apparatus, wherein said storage means stores the image data read by said reading means or the image data received by said reception means into said memory means.

6. The printing apparatus according to claim 1, further comprising an operation panel for instructing the performance of mirror-image printing.

7. A printing apparatus control method for controlling a printing apparatus which prints an image in band units, by scanning a print head having a plurality of printing elements, and which comprises memory means for storing image data for one band image to be printed by one scanning by said print head, said method comprising:

a recording step (a) of performing printing by said print head, by reading image data for a band image, to be printed by one scanning by said print head, stored at a storage area designated by a read address from said storage means, while updating the read address in a predetermined direction, and supplying the read image data to said print head;

a writing step (b) of, during the printing in said recording step, storing image data for a next band image to be printed by a next one scanning by said print head into the storage area of said memory means from which the image data for the band image has been read in said recording step, while updating a write address in the predetermined direction;

a reversing step (c) of reversing the predetermined direction for updating the read address after the printing the band image by the one scanning by said print head and writing the image data for the next band image in said writing step have been completed; and a control step of repeating said steps (a), (b) and (c) for a plurality of times which correspond to a size of the whole image to be printed, excepting a last band image, and then executing said steps (c) and (a) for the last band.

8. The printing apparatus control method according to claim 7, wherein in said recording step, when the image data for the one band image to be printed by a first scanning by said print head has been stored into said memory means at a storage area designated by the read address, the printing is started, and wherein in said writing step, when the printing in said recording step is started, a write address is generated in a direction the same as the predetermined direction for updating the read address, for storing the image data for the next band image.

9. A printing apparatus which prints an image by scanning a print head in a main-scanning direction, said print head having a plurality of printing elements aligned in a subscanning direction different from the main-scanning direction, wherein one band image, having a predetermined width in the subscanning direction, is printed by one scanning by said print head, said apparatus comprising:

memory means for storing image data to be used in one scanning by said print head, into a storage area;

address generating means for generating write and read addresses for writing/reading of the image data to/from said memory means in the main-scanning direction, and write and read addresses for writing/reading of the image data to/from said memory means in the subscanning direction;

recording means for printing an image by reading the image data from said memory means in a direction for updating the read addresses opposite to a direction for updating the write address used when the image data was written into said memory means, and supplying the read image data to said print head;

writing means for, during the printing by said recording means, storing image data to be used in a next one scanning by said print head into the storage area from which the image data for the band image has been read, while updating the write address in the predetermined direction; and reverse means for reversing the direction for updating the read/write address by every scanning by said print head.

10. A printing apparatus which prints an image by scanning a print head in a main-scanning direction, said print head having a plurality of printing elements aligned in a subscanning direction different from the main-scanning direction, wherein one band image, having a predetermined width in the subscanning direction, is printed by one scanning by said print head, said apparatus comprising:

memory means for storing image data to be used in one scanning by said print head, into a storage area;

address generating means for generating write and read addresses for writing/reading of the image data to/from said memory means in the main-scanning direction, and write and read addresses for writing/reading of the image data to/from said memory means in the subscanning direction;

recording means for printing an image by reading the image data from said memory means in a direction for updating the read addresses opposite to a direction for updating the write address used when the image data was written into said memory means, and supplying the read image data to said print head;

writing means for, during the printing by said recording means, storing image data to be used in a next one scanning by said print head into the storage area from which the image data for the band image has been read, while updating the write address in the predetermined direction; and reverse means for reversing the direction for updating the read/write address by every scanning by said print head, wherein image data for one band image to be printed by a first scanning by said print head has been stored into said memory means at a storage area designated by the read address, said recording means starts printing, and wherein when said recording means starts the printing, image data for next scan-printing is stored into said memory means in a direction the same as a direction for updating the read address.

11. A printing apparatus which prints an image by scanning a print head in a main-scanning direction, said print head having a plurality of printing elements aligned in a subscanning direction different from the main-scanning direction, wherein said print head comprises a plurality of color print heads, respectively corresponding to a plurality of colors, arranged at predetermined intervals, wherein one band image, having a predetermined width in the subscanning direction, is printed by one scanning by said print head, said apparatus comprising:

memory means for storing image data to be used in one scanning by said print head, into a storage area;

address generating means for generating write and read addresses for writing/reading of the image data to/from said memory means in the main-scanning direction, and write and read addresses for writing/reading of the image data to/from said memory means in the subscanning direction;

recording means for printing an image by reading the image data from said memory means in a direction for updating the read addresses opposite to a direction for updating the write address used when the image data was written into said memory means, and supplying the read image data to said print head;

writing means for, during the printing by said recording means, storing image data to be used in a next one scanning by said print head into the storage area from which the image data for the band image has been read, while updating the write address in the predetermined direction; and reverse means for reversing the direction for updating the read/write address by every scanning by said print head, wherein upon storing image data for one pixel, said writing means sequentially stores color component data corresponding to colors used in printing, and wherein said recording means sequentially reads out the color component data from said memory means, delays the color component data based on the interval between the color print heads and a scanning speed of said print head, and supplies the delayed color component data to the respective color print heads.

12. The printing apparatus according to claim 9, wherein said print head has a plurality of printing devices aligned in the subscanning direction substantially vertical to the main-scanning direction.

13. The printing apparatus according to claim 9, further comprising:

reading means for reading an original image by scanning a reading head having a reading width substantially the same as a width of an image printed by one scanning by said print head; and reception means for receiving image data from an external apparatus, wherein said memory means stores the image data read by said reading means or the image data received by said reception means.

14. The printing apparatus according to claim 9, further comprising an operation panel for instructing the performance of mirror-image printing by activating said memory means, said recording means and said reverse means.

15. A printing apparatus control method for controlling a printing apparatus which prints an image by scanning a print head in a main-scanning direction, said print head having a plurality of printing elements aligned in a subscanning direction different from the main-scanning direction, and which comprises memory means for storing image data for one band image to be printed by one scanning by said print head, said method comprising:

a first writing step of writing image data for first band image to be printed into said memory means;

a recording step (a) of performing printing by said print head, by reading image data for a band image, to be printed by one scanning by said print head, stored at a storage area designated by a read address of said memory means, while updating the read address in a predetermined direction, and supplying the read image data to said print head;

a writing step (b) of, during the printing in said recording step, storing image data for a next band image to be printed by a next one scanning by said print head into the storage area of said memory means from which the image data for the band image has been read in said recording step, while updating a write address in the predetermined direction;

a reversing step (c) of reversing the predetermined direction for updating the read address when the printing the band image by the one scanning by said print head and writing the image data for the next band image in said writing step have been completed; and a control step of repeating said steps (a), (b) and (c) for a plurality of times which corresponds to a size of the whole image to be printed, excepting last band image, and then executing said steps (c) and (a) for printing last band.

16. A printing apparatus control method for controlling a printing apparatus which prints an image by scanning a print head in a main-scanning direction, said print head having a plurality of printing elements aligned in a subscanning direction different from the main-scanning direction, wherein said print head comprises a plurality of color print heads, respectively corresponding to a plurality of colors, arranged at predetermined intervals, and which comprises memory means for storing image data for one band image to be printed by one scanning by said print head, said method comprising:

a first writing step of writing image data for first band image to be printed into said memory means;

a recording step (a) of performing printing by said print head, by reading image data for a band image, to be printed by one scanning by said print head, stored at a storage area designated by a read address of said memory means, while updating the read address in a predetermined direction, and supplying the read image data to said print head;

a writing step (b) of, during the printing in said recording step, storing image data for a next band image to be printed by a next one scanning by said print head into the storage area of said memory means from which the image data for the band image has been read in said recording step, while updating a write address in the predetermined direction;

a reversing step (c) of reversing the predetermined direction for updating the read address when the printing the band image by the one scanning by said print head and writing the image data for the next band image in said writing step have been completed; and a control step of repeating said steps (a), (b) and (c) for a plurality of times which corresponds to a size of the whole image to be printed, excepting last band image, and then executing said steps (c) and (a) for printing last band, wherein in said writing step, upon storing image data for one pixel, color component data corresponding to colors used in printing are sequentially stored into said memory means, and wherein in said recording step, the color component data are sequentially read out from said memory means, delayed in dependence upon a scanning speed of said print head, and supplied to the respective color print heads.

17. The printing apparatus control method according to claim 15, wherein said print head has a plurality of printing devices in the subscanning direction.

18. The printing apparatus control method according to claim 15, wherein said printing apparatus further comprises:

reading means for reading an original image by scanning a reading head having a reading width substantially the same as a width of an image printed by one scan-printing by said print head; and reception means for receiving image data from an external apparatus, wherein in said storage step, the image data read by said reading means or the image data received by said reception means is stored into said memory means.

19. The printing apparatus control method according to claim 15, further comprising a step of performing storing in said writing step, printing in said recording step and reversing in said reverse step, in accordance with instructions from a predetermined operation panel.

\* \* \* \* \*

UNITED STATES PATENT AND TRADEMARK OFFICE
CERTIFICATE OF CORRECTION

PATENT NO. : 5,768,484
DATED : June 16, 1998
INVENTOR(S) : KOJI ARAI, ET AL.

Page 1 of 2

It is certified that error appears in the above-identified patent and that said Letters Patent is hereby corrected as shown below:

ON THE TITLE PAGE:

AT [57] ABSTRACT

Line 8, "an descending" should read --a descending--.

AT [56] REFERENCES CITED

U.S. PATENT DOCUMENTS

Insert:  --5,467,437   11/1995   Fuse..............395/45
           4,844,770    7/1989   Shiraishi et al...156/387
           5,003,382    3/1991   Omi et al.........358/75
           5,040,074    8/1991   Stemmle--.........358/296

COLUMN 6

Line 16, "perform" should read --performing--.

COLUMN 7

Line 33, "were" should read --where--.

COLUMN 8

Line 12, "step" should read --in step--.

UNITED STATES PATENT AND TRADEMARK OFFICE
CERTIFICATE OF CORRECTION

PATENT NO. : 5,768,484
DATED : June 16, 1998
INVENTOR(S) : KOJI ARAI, ET AL.

It is certified that error appears in the above-identified patent and that said Letters Patent is hereby corrected as shown below:

<u>COLUMN 13</u>

Line 61, "printing the" should read --printing of the--.

<u>COLUMN 16</u>

Line 35, "printing the" should read --printing of the--.

Signed and Sealed this

Twenty-third Day of March, 1999

Attest:

Q. TODD DICKINSON

*Attesting Officer*　　　*Acting Commissioner of Patents and Trademarks*